(12) United States Patent
Yang et al.

(10) Patent No.: US 12,276,539 B2
(45) Date of Patent: Apr. 15, 2025

(54) METHOD AND DEVICE FOR DIAGNOSING WEIGHING SYSTEM

(71) Applicants: Mettler-Toledo (Changzhou) Precision Instruments Ltd, Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Jianqiang Yang, Changzhou (CN); Lifeng Cai, Changzhou (CN); Jianwei Wu, Changzhou (CN)

(73) Assignees: Mettler-Toledo (Changzhou) Precision Instruments Ltd, Changzhou (CN); Mettler Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 592 days.

(21) Appl. No.: 17/303,579

(22) Filed: Jun. 2, 2021

(65) Prior Publication Data

US 2021/0381881 A1 Dec. 9, 2021

(30) Foreign Application Priority Data

Jun. 9, 2020 (CN) .......................... 202010518537.2

(51) Int. Cl.
*G01G 23/01* (2006.01)
*G05B 23/02* (2006.01)

(52) U.S. Cl.
CPC .......... *G01G 23/01* (2013.01); *G05B 23/0235* (2013.01); *G05B 23/027* (2013.01); *G05B 23/0283* (2013.01)

(58) Field of Classification Search
CPC .............. G05B 23/0235; G05B 23/027; G05B 23/0283; G01G 23/01
See application file for complete search history.

(56) References Cited

U.S. PATENT DOCUMENTS 8,055,456 B2 * 11/2011 Loher .................... G01G 21/30
702/41
9,587,974 B2 * 3/2017 Wechselberger .. G01G 23/3735
(Continued)

FOREIGN PATENT DOCUMENTS

CN 110864795 A 3/2020

*Primary Examiner* — Natalie Huls
(74) *Attorney, Agent, or Firm* — Standley Law Group LLP; Jeffrey S. Standley; Adam J. Smith

(57) ABSTRACT

A method and device are provided for diagnosing a weighing system. In the method, the weighing system acquires an intrinsic parameter, a status parameter, and an operating parameter of various components of the weighing system, environmental parameters of the weighing system application, and communication data and interaction data among all the components. A first-level prompt is sent when the status of any of the components is abnormal, such that the system stops operating. A second-level prompt is sent when the status of each of the components is normal and the service life status of at least one of the components reaches a preset threshold. A third-level prompt is sent when the status of each of the components is normal and a system performance abnormality event is identified for the performance status of the system. A fourth-level prompt is sent when the status of each of the components is normal.

16 Claims, 1 Drawing Sheet

(56) References Cited

U.S. PATENT DOCUMENTS

| | | | | |
|---|---|---|---|---|
| 9,638,756 B2* | 5/2017 | Srinivasan | ............. | G01R 31/36 |
| 10,260,933 B2* | 4/2019 | Kostic | ................... | G01G 23/01 |
| 11,709,091 B2* | 7/2023 | McDonald | ........... | G01G 19/021 |
| | | | | 702/34 |
| 2002/0066602 A1* | 6/2002 | Bliss | ................. | G01G 23/3735 |
| | | | | 177/25.13 |

* cited by examiner

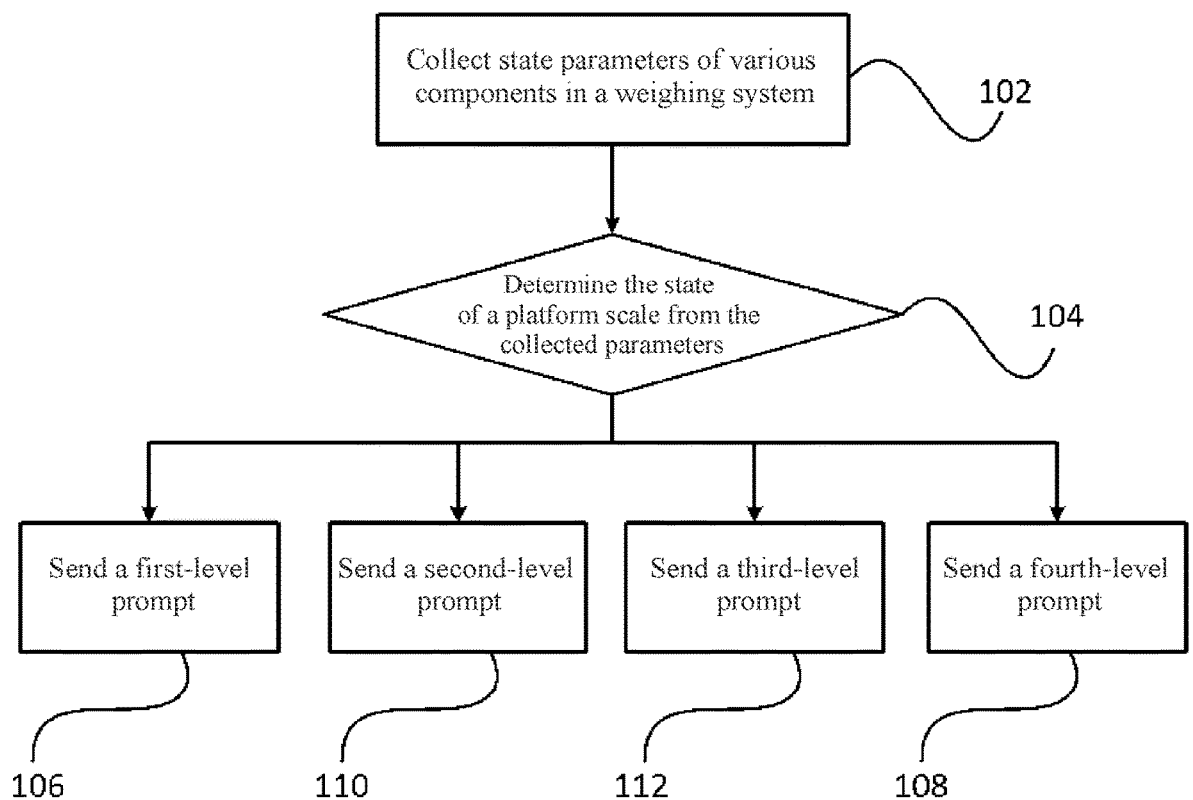

METHOD AND DEVICE FOR DIAGNOSING WEIGHING SYSTEM

CROSS-REFERENCE TO RELATED APPLICATIONS

This application makes a claim of priority to Chinese application CN 202010518537.2, filed on 9 Jun. 2020, which is incorporated by reference as if fully recited herein.

TECHNICAL FIELD

The present invention relates to a method and a device for diagnosing a weighing system.

BACKGROUND ART

A weighing system usually comprises a weighing sensor, a transmitter, a programmable logic controller (PLC), a weighing platform, and various types of peripheral sensors, such as those for sensing temperature, humidity, gas, angle and electromagnetic force, and global positioning system (GPS), for use in various weighing applications, herein referred as components.

As the composition of the weighing system tends to be complex, when a fault or problem occurs in the weighing system, it is difficult to determine the source of the fault or problem. Therefore, all the constituent parts in the weighing system are still independently diagnosed and determined at present, for example, a weighing sensor itself is subjected to fault diagnosis and gives an alarm.

However, in addition to the fault of a component of the system, improper use, incorrect mounting and abnormal environments, etc. may also cause a fault in the weighing system, and even if the component gives an alarm, it is difficult to determine the true cause of the fault because the component itself has no fault, which makes it difficult for maintenance personnel to quickly maintain the system in a timely manner, thereby reducing the use experience of a user.

SUMMARY OF THE INVENTION

The technical problem to be solved by the present invention is to overcome that a weighing system fault cannot be effectively diagnosed in a timely manner in a prior art weighing system, to provide a method and a device for diagnosing a weighing system, in which the entire weighing system is monitored, such that an actual fault of the system is detected and analyzed, alarm information is output in a timely manner, and a customer is guided to perform a next operation.

The present invention solves the above technical problem by the technical solution of a method for diagnosing a weighing system, the method comprising the steps of:

acquiring intrinsic parameters, status parameters, and operating parameters of components of the weighing system, and system application environment parameters; acquiring communication data and interaction data among all the components, by the weighing system; and by a processing unit, determining the status of each the components from the intrinsic parameters, status parameters, and operating parameters of all the components; obtaining the service life status of each of the components from the intrinsic parameters, status parameters, and operating parameters of all the components, as well as the communication data and interaction data among all the components through calculation and/or table lookup and comparison; calculating and determining a system performance status from the intrinsic parameters, status parameters and operating parameters of all the components, the communication data and interaction data among all the components, and the environment parameters of the weighing system application;

sending a first-level prompt when the status of any of the components is abnormal, such that the system stops operating;

sending a second-level prompt when the status of each of the components is normal and the service life status of at least one of the components reaches a preset threshold;

sending a third-level prompt when the status of each of the components is normal and a system performance abnormality event is identified for the performance status of the system; and sending a fourth-level prompt when the status of each of the components is normal.

Preferably, the first-level prompt further comprises fault information; the second-level prompt further comprises predicted life time limits which are obtained from the service life status of each of the components through calculation and/or table lookup and comparison; the third-level prompt further comprises guidance information of abnormality elimination obtained by means of table lookup or comparison or matching with the system performance abnormality event; and the fourth-level prompt comprises service life status information of all the components or comprises service life status information of all the components and the predicted life time limits.

By setting the plurality of levels of prompts, a user can quickly identify a fault and a potential fault in the weighing system, and perform operations in a timely manner according to guidance, so as to eliminate the faults and problems.

Preferably, the four levels of prompts are sent according to different preset reminding modes.

Preferably, the reminding modes comprise sending the prompt to the weighing system, to a mobile terminal, or to a server or a cloud service device or a network service device, and sending the prompt at a preset time interval or continuous sending for a preset time length.

Different reminding modes are set to remind and notify the user in a timely manner according to the severity of faults in the weighing system, and the mobile terminal is used to remind not only the user anytime and anywhere, but also a manufacturer of the weighing system through a service such as a network, so as to provide a faster response speed.

Preferably, an application mode of the weighing system is acquired, and the type of, a calculation formula, a preset threshold and a table for parameters that are collected in the weighing system, an abnormality identification algorithm and table, and the content of reminding modes for the prompts of all the levels are configured according to the application mode.

Preferably, the type of, a calculation formula, a preset threshold and a table for parameters that are collected in the weighing system, an abnormality identification algorithm and table, and the content of reminding modes for all the prompts are acquired from a server or a cloud service device or a network service device and configured or updated in the processing unit.

For different application scenarios, conditions, content, and determination for alarms are independently set, so as to improve the alarm accuracy. At the same time, various configuration parameters and information are updated in a timely manner with a cloud service or a network service, such that the user can automatically acquire the latest system configuration in a timely manner without manual operations, and information is learned about in a more timely manner.

Preferably, when a plurality of different levels of prompts are sent simultaneously, the prompts are sent in the order of the first level, the second level, the third level, and the fourth level, with the prompt at a higher level being sent first.

A device for diagnosing a weighing system is provided, by comprising:
  a weighing system for acquiring intrinsic parameters, status parameters, and operating parameters of components of the weighing system, and environment parameters of the weighing system application, and further acquiring communication data and interaction data among all the components; and
  a processing unit for determining the status of each of the components from the intrinsic parameters, status parameters, and operating parameters of all the components, obtaining the service life status of all the components from the intrinsic parameters, status parameters, and operating parameters of all the components, as well as the communication data and interaction data among all the components through calculation and/or table lookup and comparison, and calculating and determining a system performance status from the intrinsic status parameters and operating parameters of all the components, the communication data and interaction data among all the components, and the system application environment parameters of the weighing system,
  wherein the processing unit is able to send a first-level prompt when the status of any of the components of the weighing system is abnormal, and stops the weighing system from operating;
  the processing unit is able to send a second-level prompt when the status of each of the components is normal and the service life status of at least one of the components reaches a preset threshold;
  the processing unit is able to send a third-level prompt when the status of each of the components is normal and a system performance abnormality event is identified for the performance status of the system; and
  the processing unit is able to send a fourth-level prompt when the status of each of the components is normal.

Preferably, the processing unit is a computer, a server, a cloud service device, or a network service device.

Preferably, the four levels of prompts are sent according to different preset reminding modes.

Preferably, the reminding modes comprise sending the prompt to the weighing system, to a mobile terminal, or to a server or a cloud service device or a network service device, and sending the prompt at a preset time interval or continuous sending for a preset time length.

Preferably, the processing unit acquires an application mode of the weighing system, and configures, according to the application mode, the type of, a calculation formula, a preset threshold and a table for parameters that are collected in the weighing system, an abnormality identification algorithm and table, and the content of reminding modes for the prompts of all the levels.

Preferably, the processing unit further acquires, from a third-party server or cloud service device or network service device, configures and updates the type of, a calculation formula, a preset threshold and a table for parameters that are collected in the weighing system, an abnormality identification algorithm and table, and the content of reminding modes for all the prompts.

A storage medium is provided, which is characterized by comprising a stored program that, when running, controls a processing unit in which the storage medium is located to perform the method for diagnosing a weighing system as described above.

The positive improvement effects of the present invention are as follows:
  the method and the device for diagnosing a weighing system in the present invention provide a real-time and automatic fault detection and prediction solution, in which signals of the entire weighing system are monitored, and once a fault is detected, alarm information is output immediately, and a customer is guided to perform a next operation, thus providing the customer with timely and useful information and further improve the customer satisfaction.

Moreover, by means of pre-diagnosis and abnormal use of system components, the customer can be notified of the operating status and possible faults of all the components in the system in advance, at the same time, it is ensured that system performance criteria and indicators are satisfied during operating of the system, and at the same time, the management of a full life cycle of the weighing system is also implemented, thereby improving the use feeling of the customer.

BRIEF DESCRIPTION OF THE DRAWING

The single drawing sheet accompanying this specification is a flowchart of a method for diagnosing a weighing system according to one embodiment of the present invention.

DETAILED DESCRIPTION OF EMBODIMENTS

The present invention will be further described below by way of examples, but the present invention is not therefore limited to the scope of the described embodiments.

A method for diagnosing a weighing system comprises the steps of:
  by the weighing system, acquiring status parameters and operating parameters of various components of the weighing system, and environment parameters of the weighing system application; and acquiring communication data and interaction data among all the components; and
  by a processing unit, determining the status of each of the components from the status parameters and operating parameters of all the components; obtaining the service life status of all the components from the status parameters and operating parameters of all the components, as well as the communication data and interaction data among all the components through calculation and/or table lookup and comparison; calculating and determining a system performance status from the operating parameters of all the components, the communication data and interaction data among all the components, and the environment parameters of the weighing system application;
  sending a first-level prompt when the status of any of the components is abnormal, such that the system stops operating;

sending a second-level prompt for a preset reminding cycle when the status of each of the components is normal and the service life status of at least one of the components reaches a preset threshold;

sending a third-level prompt when the status of all the components are normal and a system performance abnormality event is identified for the performance status of the system; and sending a fourth-level prompt for a preset cycle or always giving the fourth-level prompt when the status of each of the components is normal.

The first-level prompt further comprises fault information; the second-level prompt further comprises predicted life time limits which are obtained from the service life status of each of the components through calculation and/or table lookup and comparison; the third-level prompt further comprises guidance information of abnormality elimination obtained by means of table lookup or comparison or matching with the system performance abnormality event; and the fourth-level prompt comprises service life status information of all the components or comprises service life status information of all the components and the predicted life time limits.

The status parameters of all the components that constitute the weighing system comprise structures about the components themselves, physical parameters of the components, status of output signals, etc., for example, a structural integrity status of an elastic body in a weighing sensor, the status of output signals of devices such as a strain gauge and a nickel foil on the elastic body in the weighing sensor, and for another example, the On/Off status of components such as a cable in the weighing system or parameters of a plurality of complete scales in the weighing system.

The operating parameters of each of the components comprise output data, process data and historical information records of the component in an operating process of the weighing system, as well as diagnosis data of each of the components, etc., for example, weighing data output by a weighing sensor, weighing data output records, abnormality data of the weighing sensor, status abnormality records, etc.

The communication data among all the components comprises data transmitted between all the components and data records, etc., for example, data transmitted between each weighing sensor and a meter and records. The interaction data among all the components comprises diagnosis data of all the components and parameter configuration data of all the components, for example, parameters of all weighing sensors that are configured by a meter.

The system application environment parameters comprise parameters of an environment where the system is located and parameters of an environment where all the components are located, including temperature, humidity, gas and angle, and an electromagnetic force, a GPS, etc.

In one embodiment of a method for diagnosing a floor scale or platform scale, which comprises four weighing sensors. When the platform scale is diagnosed, an information collection step 102 is first performed, and in a diagnosis system, a processing unit, here in the form of a computer, collects status parameters of all the components in the weighing system, i.e. here the platform scale, including the following status parameters of each weighing sensor: whether an elastic body (beam or column) is deformed or fractured, whether a core device such as a strain gauge, a nickel foil, or a PT (thermistor) is detached, short-circuited, or open-circuited; whether a supply voltage of the sensor is within a normal range, etc. In this embodiment, status parameters used for communication between a terminal of the platform scale and each weighing sensor are further collected, for example: an open circuit or a short circuit of a communication cable; whether a supply voltage or current of a system is too low or too high; and whether a or several weighing sensors are offline. Moreover, in this embodiment, operating status parameters of a terminal connected to each weighing sensor are further collected.

The computer further collects operating parameters of all the components of the platform scale, including the following parameters in each weighing sensor:

Process data, and the number of loading times in different weighing ranges; the number of overloading times, an overloaded weight, and a time at which overloading occurs; an impact weight, a time at which the impact occurs, and the number of impacts; temperature and humidity, and data of an accelerometer sensor, etc.

Historical records, such as an overloaded and impact weight, and a time at which overloading and an impact occurs; a voltage value; and data of various environment sensors and position sensors, etc.

Weighting data, used by a terminal to determine whether a zero or weight data of a certain sensor is different from that of other weighing sensors, and used to determine a loading position of a loaded object on a weighing platform, etc.

Moreover, the computer further collects environment parameters of the platform scale application, including temperature, humidity, acceleration, etc.

Then in a status determination step 104, the computer determines the status of the platform scale from the collected parameters, and sends a corresponding prompt according to the status of the platform scale.

In step 106 of sending a first-level prompt, when the detects, from the status parameters of all the components, that the status of any of the components such as a weighing sensor or a communication cable is abnormal, for example, the breakage of the elastic body, the detachment of the strain gauge and other abnormalities, the weighing sensor cannot work in this case, and therefore the system also cannot work normally. In this case, the computer sends a first-level alert, alert information is displayed on a display screen of the computer or a display screen of the weighing scale, and the platform scale is controlled to stop operating, wherein the alert information comprises a fault status recorded by the computer, and according to fault elimination solutions preset in the computer, a fault elimination solution corresponding to the current fault is selected to notify a user of accurately locating the fault point and the fault cause, and ask the user to replace the faulty component immediately.

When the status of each of the components of the platform scale is normal, the computer calculates, on one hand, the service life status of all the components, and detects, on the other hand, whether the use of the platform scale by the user is standard, from the status parameters and operating parameters of all the components and the environment parameters of the application. Non-standard use of the platform scale by the user not only affects the precision of the platform scale, but also reduces the service life of components in the platform scale.

In step 108 of sending a fourth-level prompt, when the use of the platform scale by the user is standard, and all the components of the platform scale operate normally, the computer uses process data and historical data that are recorded in real time to obtain service life status of the components through calculation and/or table look and comparison, and the computer sends the fourth-level prompt to display, via a display screen, to the user how much the product service lifetime is left and how long the product can be used, which helps the user learn about the service life status of the platform scale, and maintain or replace the product in a timely manner, thereby ensuring service and work continuity.

In step 110 of sending a second-level prompt, after the service life status of the component is obtained, if the service life status of the component reaches a preset service life, the computer sends the second-level prompt. Likewise, the user is warned via the display screen that the product reaches or approaches the end of the service life and is notified of a specific replacement time.

In step 112 of sending a third-level prompt, when all the components of the platform scale operate normally and are in the course of their service life, and when the use thereof by the user is non-standard, the precision of the platform scale is significantly affected. Therefore, in the case where the computer detects that the non-standard use causes abnormal weighing of the platform scale, the third-level prompt is sent by means of the display screen, etc., to warn the user that there is an abnormal operation, and notify the user of an abnormality elimination method or a correct use guidance on the display screen or in other display manners according to preset abnormality elimination solutions. By guiding the user to use the product correctly and standardizing operations of the user, the weighing precision of the system is ensured and the service life of the product is prolonged.

In a weighing application process performed by the user using the platform scale of this embodiment, when non-standard operations of impacts on the scale during weighing of a heavy object occur a plurality of times, the weighing sensor, or a connector between a sensor and the weighing platform is deformed, and consequently, the performance such as a zero and sensitivity of the weighing platform exceeds a precision range. When it is detected that the amplitude of the impact exceeds a set threshold, a server identifies an abnormality event from a preset abnormality event category, and sends the third-level prompt, to notify the user of violation operations and of checking whether the sensor or the connector is offset.

When an object is loaded at a declination, an excessive overload of a certain sensor is caused and the service life thereof is affected, and at the same time, a diagonal sensor is tilted, and thus the performance such as linearity and hysteresis of the platform scale is very poor. A loading position of the object on the weighing platform is calculated by detecting proportional relationships among weight outputs of the four weighing sensors, and the server identifies an abnormality event from the preset abnormality event category, and sends the third-level prompt to notify the user of loading the object centrally instead of eccentrically.

When the impact or eccentric loading occurs too many times, i.e. exceeds a set threshold, and it is learned about, through table lookup and comparison, that the service life of a component is approaching its limit, a prompt level is upgraded from the third level to the second level in this case, and the user is notified of replacing the corresponding component for a specified time period, and if no replacement is performed for more than the specified time period, the systems may have a crucial fault, and consequently, cannot be used normally. In addition to notifying the user of the fault degree, the second-level prompt further notifies the specific replacement time, such that the user performs replacement when the device is idle, avoiding the problem that the device cannot be used due to a fault occurring in a production process, and avoiding losses.

In addition to the non-standard use of the user, when it is detected that the environment is abnormal or has a drastic change, for example, there is a drastic change in temperature, humidity, or air pressure, the precision of the platform scale may also be significantly affected. Therefore, this case is also used as in the case of abnormal weighing on the platform scale of this embodiment, and in this case the computer also sends the third-level prompt to notify the user of a specific fault, and guide the user to check, and if the change in the temperature of a certain sensor is intensified or abnormal relative to other sensors, the computer notifies the user of checking the change in surrounding environments of the corresponding sensor, such as whether there is a heat source, and whether the corresponding sensor is immersed into water, and then the user deals with it quickly, thereby ensuring high-precision application.

In another variant example, the computer further uploads, i.e. to a cloud server, the status and service life of the platform scale, and event abnormality information such as non-standard operation of the user and environment changes, such that a device manufacturer can follow a device service.

For example, when the server detects a short circuit or an open circuit of a bridge circuit of a strain gauge in one weighing sensor from the information obtained from the platform scale, and the platform scale has been unable to work in this case, the server sends the first-level prompt and the platform scale is turned off. Also, the first-level prompt and fault information content are sent to the device manufacturer by means of a network server, such that the device manufacturer provides a maintenance service in a timely manner.

In one further embodiment of a method for diagnosing a vehicle scale, which comprises a plurality of weighing sensors. Before the vehicle scale is diagnosed, an application mode of the vehicle scale is determined by the processing unit. In this embodiment, where a weighing application mode of the vehicle scale is determined, a processing unit, here in the form of a server, configures, according to preset parameters, formulas, etc., the type of, a calculation formula, a preset threshold and a table for the collected parameters, an abnormality identification algorithm and table, and the content of and reminding modes for all the prompts.

When the vehicle scale is diagnosed, the server collects status parameters of all the components of the vehicle scale, including the following parameters in each weighing sensor: whether an elastic body (column) is deformed or fractured, and whether a ball head is worn; whether a core device such as a strain gauge, a nickel foil, or a PT (thermistor) is detached, short-circuited, or open-circuited; and a sudden change (for example, the case of cheating); and whether a supply voltage is within a normal range, etc.

In this embodiment, status parameters used for communication between a terminal of the vehicle scale and each weighing sensor are further collected, for example: an open circuit or a short circuit of a communication cable; whether a supply voltage or current of a system is too low or too high; and whether a or several weighing sensors are offline. Moreover, in this embodiment, operating status parameters of a terminal connected to each weighing sensor are further collected.

The server further collects operating parameters of all the components of a weighing scale, including the following parameters in each weighing sensor:

Process data, and the number of loading times in different weighing ranges; the number of overloading times, an overloaded weight, and a time at which overloading occurs;

an impact weight, a time at which the impact occurs, and the number of impacts; data of a gas sensor and an acceleration sensor, etc.

Historical records, such as an overloaded and impact weight, and a time at which overloading and an impact occurs; a voltage value; data of a gas and an accelerometer sensor, etc.

Weighting data, used by a terminal to determine whether a zero or weight data of a certain sensor is different from that of other weighing sensors, and used to determine a loading position of a loaded vehicle on a weighing platform, etc.

Moreover, the server further collects application environment parameters of the vehicle scale, including temperature, humidity, acceleration, etc.

After collecting the status information mentioned above and determining that the status of any of the components is abnormal, the server sends a first-level prompt to enable the vehicle scale to stop operating, records a fault status and notifies a user of accurately locating the fault point and the fault cause, and asks the user to replace the faulty component immediately.

When the status of each of the components of the vehicle scale is normal, the server calculates, on one hand, the service life status of all the components, and detects, on the other hand, whether the use of the platform scale by the user is standard, from the status parameters and operating parameters of all the components and the application environment parameters. Non-standard use of the vehicle scale by the user not only affects the precision of the vehicle scale, but also reduces the service life of components in the vehicle scale. The server determines, by detecting a use status or an operating status of the vehicle scale, a prompt that needs to be sent, to guide the user to use the product correctly and standardizes operations of the user, such that the weighing precision of the system is ensured and the service life of the product is prolonged.

After the vehicle scale is used for a time period, a weighing sensor may be offset. As a result, the weighing is inaccurate. In this embodiment, the acceleration sensor is also used to identify an inclination angle and an inclination direction of the weighing sensor in real time, and once the angle exceeds a set threshold, a third-level prompt is sent to notify, in a timely manner, the user of adjusting the sensor, so as to ensure high-accuracy weighing.

When non-standard operations of impacts on the vehicle scale during loading of the vehicle on the scale occur a plurality of times, a weighing sensor is deformed or the ball head is worn, and consequently, the performance such as a zero and sensitivity of the weighing platform exceeds a precision range. In this embodiment, when it is detected that the amplitude of the impact exceeds a set threshold, the server identifies an abnormality event from a preset abnormality event category, and sends the third-level prompt, to notify the user of violation operations and guide the user to check the zero and sensitivity of the vehicle scale.

In this embodiment, asymmetric loading of the object on the vehicle scale is calculated by detecting proportional relationships among weight outputs of a plurality of weighing sensors, and the server identifies an abnormality event from the preset abnormality event category, and sends the third-level prompt to notify the user of loading the vehicle on the weighing platform centrally instead of eccentrically. Also, when eccentric loading of the vehicle occurs, sensors at a certain side are overloaded and the service life thereof is affected; and if it is learned about, through table lookup and comparison, that the service life of a component is approaching its limit, a prompt level is upgraded from the third level to the second level in this case, and the user is notified of replacing the corresponding component for a specified time period, and if no replacement is performed for more than the specified time period, the system may have a crucial fault, and consequently, cannot be used normally.

When it is detected that the concentration of gas inside a weighing sensor is decreased and exceeds a set threshold, the system sends a second-level prompt to notify the user of replacing the product for a specified cycle, otherwise the sensor will not be used if no replacement of the sensor is performed for more than the specified cycle. The advanced prompt can ensure that the user can replace the component when the vehicle scale is idle, avoiding other losses caused by the problems occurring in use.

When an impact or asymmetric loading occurs on the vehicle scale too many times, i.e. exceeds a set threshold, a fault prompt level is upgraded to a second-level prompt, and the user is notified of replacing the corresponding component for a specified time period, and if no replacement is performed for more than the specified time period, the system may have a crucial fault, and consequently, cannot be used normally. In this embodiment, in addition to notifying the user of the fault degree, the second-level prompt further notifies the specific replacement time, such that the user performs replacement when the device is idle, avoiding the problem that the device cannot be used due to a fault occurring in a production process, and avoiding losses.

The server further uses historical data recorded in real time to obtain the service life status of components through calculation and/or table lookup and comparison, and sends a fourth-level prompt to the user, so as to display, through the most direct data, how much the product service lifetime is left and how long the product can be used.

Moreover, in this embodiment, the first-level prompt is continuously sent to the user in the form of an alert, for example, when receiving the first-level prompt, a display screen of a terminal of the vehicle scale or a server always displays the first-level prompt until the system returns to normal.

In this embodiment, the second-level prompt is used to prompt the user in the form of an alert each time the user turns on the vehicle scale, or notify, in a manner of prompting once every 12 hours, the user of replacing the component as soon as possible.

In this embodiment, the third-level prompt is used to notify, in the form of a prompt box, the user of an event that the device performance, such as non-standard operations, is affected. When the event occurs, the user is notified immediately by means of the prompt box, and is guided to properly use or maintain the system.

In this embodiment, for the fourth-level prompt, a prompt box or part of a resident display screen enables the user to know the service life status of all the components in the system in a timely manner.

When an application of the vehicle scale in this embodiment is configured in a vehicle scale mounting mode, the server configures, according to preset parameters, formulas, etc., the type of, a calculation formula, a preset threshold and a table for the collected parameters, an abnormality identification algorithm and table, and the content of and reminding modes for all the prompts.

When the vehicle scale is diagnosed, the server collects status parameters of all the components of the vehicle scale, including the following parameters in each weighing sensor: whether an elastic body (column) is deformed or fractured, and whether a ball head is worn; whether a core device such as a strain gauge, a nickel foil, or a PT (thermistor) is detached, short-circuited, or open-circuited; and a sudden change (for example, the case of cheating); and whether a supply voltage is within a normal range, etc.

In this embodiment, status parameters used for communication between a terminal of the vehicle scale and each weighing sensor are further collected, for example: an open circuit or a short circuit of a communication cable; whether a supply voltage or current of a system is too low or too high; and whether a or several weighing sensors are offline. Moreover, in this embodiment, operating status parameters of a terminal connected to each weighing sensor are further collected.

The server further collects application environment parameters of the vehicle scale, including temperature, humidity, acceleration, etc.

After collecting the status information mentioned above and determining that the status of any of the components is abnormal, the server sends a first-level prompt to enable the vehicle scale to stop operating, records a fault status and notifies a user of accurately locating the fault point and the fault cause, and asks the user to replace the faulty component immediately.

When the status of all the components of the vehicle scale are normal, the vehicle scale identifies, with information of an inclination angle of the acceleration sensor, whether the weighing sensors in the vehicle scale are mounted in place, and if it is detected that the inclination angle exceeds a set range, the third-level prompt is sent to notify the user that the sensor is inclined and of an inclination direction, so as to guide the user to properly adjust the sensor, thereby ensuring weighing precision.

During the mounting of the vehicle scale, its service life is not monitored, and in this case, a diagnosis system outputs only the first-level prompt and the third-level prompt.

In another variant example, event abnormality information is further uploaded to a network device such as a mobile communication network, such that a device manufacturer can follow a device service in real time.

For example, when the server detects, from information obtained from the vehicle scale system, that the concentration of gas in a weighing sensor is lower than a set threshold, the server sends the second-level prompt to notify the user of replacing the weighing sensor for a specified time period, so as to ensure that the system operates continuously and normally. At the same time, the second-level prompt and fault information content are further sent to the device manufacturer by means of a mobile network provided by a network service provider, such that the device manufacturer provides a maintenance service in a timely manner.

In still another variant example, the server acquires configuration parameters and data in different application modes from a third party such as the manufacturer by means of a cloud service, or a mobile communication network, etc. In this case, the server can configure, according to the actual application status of the vehicle scale, the latest parameters and data used for system diagnosis.

In another embodiment of a method for diagnosing a balance, the balance is a single-point application. When the balance is diagnosed, a processing unit, here in the form of a cloud server, collects status parameters of various components in the balance, including whether an elastic body in each weighing sensor is deformed or fractured; whether a core device such as a strain gauge, a nickel foil, or a PT (thermistor) is detached, short-circuited, or open-circuited, or whether a magnetic coil is detached, short-circuited, or open-circuited; whether a supply voltage is within a normal range, etc.

In this embodiment, status parameters used for communication with weighing sensors in the balance are further collected, for example: an open circuit or a short circuit of a communication cable; whether a supply voltage or current of a system is too low, too high, etc.

The cloud server further collects the following parameters of the weighing sensors: process data, and the number of loading times in different weighing ranges; the number of overloading times, an overloaded weight, and a time at which overloading occurs; an impact weight, a time at which the impact occurs, and the number of impacts; temperature and humidity, and data of an acceleration sensor, etc.

Historical records, such as an overloaded and impact weight, and a time at which overloading and an impact occurs; a voltage value; temperature and humidity, and data of an accelerometer sensor.

After collecting the status information mentioned above and determining that the status of any of the components is abnormal, the cloud server sends a first-level prompt to enable the balance to stop operating, records a fault status, sends information such as a prompt to a mobile device such as a mobile phone of a user by means of a mobile network, notifies the user of accurately locating the fault point and the fault cause, and asks the user to replace the faulty component immediately.

When the status of each of the components of the balance is normal, the cloud server calculates, on one hand, the service life status of each of the components, and detects, on the other hand, whether the use of the balance by user is standard, by collecting the parameter data above. Moreover, information such as a corresponding prompt is sent to the mobile device such as the mobile phone of the user in a timely manner, to guide the user to use the product correctly and standardize operations of the user, and a change in the environment is detected in real time to initiate self-adjustment, so as to ensure the weighing precision of the balance and prolong the service life of the product.

In a weighing application process of the balance, the balance is a high-precision and small-capacity weighing application, the elastic body thereof can easily be deformed or fractured by an impact, which makes the performance very poor or the use of balance impossible. When non-standard operations of impacts on a weighing tray of the balance occurs a plurality of times, a weighing sensor is deformed, and consequently, the performance such as a zero and sensitivity exceeds a precision range. When it is detected that the amplitude of the impact exceeds a set threshold, the cloud server identifies an abnormality event from a preset abnormality event category, and sends the third-level prompt to notify the user of violation operations.

Since balance weighing is particularly sensitive to environments, and a sudden change in the temperature may cause performance degradation such as zero drift and creep, the cloud server sends, by determining, by means of a temperature sensor, that a change rate of temperature of the external environment exceeds a set range, the third-level prompt to notify the user of paying attention to the environment change and performing weighing application in a stable environment.

A balance using a strain sensor is particularly sensitive to humidity, when the humidity of an environment changes suddenly or the balance is in a high-humidity environment for a long time, performance degradation such as zero drift and creep may be caused. The cloud server sends, by determining, by means of a humidity sensor, that a change rate of humidity of the external environment exceeds a set range or the balance is in the high-humidity environment, the third-level prompt to notify the user of paying attention to the humidity change and performing weighing application in a stable-humidity environment.

The inclination of a balance caused by an uneven platform will greatly affect the weighing precision, and therefore, when monitoring a change in the angle in real time by means of an accelerometer sensor, which exceeds a set threshold, the cloud server sends the third-level prompt to notify the user of adjusting the horizon, so as to ensure high-precision weighing.

When detecting the vibration in the environment by means of an accelerometer, which exceeds a threshold, the cloud server sends the third-level prompt, and in this case, there is a relatively large vibration in the environment, which may lead to a jump in weighing data. The user is notified, through a prompt, of checking around to determine the causes of the vibration or replacing a measurement environment, so as to ensure high-precision weighing.

When an impact or asymmetric loading occurs on the balance too many times, i.e. exceeds a set threshold, a fault prompt level is upgraded to a second-level alert, and the user is notified of replacing the corresponding component for a specified time period, and if no replacement is performed for more than the specified time period, the systems may have a crucial fault, and consequently, cannot be used normally. In addition to notifying the user of the fault degree, the second-level alert further notifies the specific replacement time, such that the user performs replacement when the device is idle, avoiding the problem that the device cannot be used due to a fault occurring in a production process, and avoiding losses.

The cloud server further uses historical data recorded in real time to obtain the service life status of components through calculation and/or table lookup and comparison, and sends a fourth-level prompt to the user, so as to display, through the most direct data, how much the product service lifetime is left and how long the product can be used.

Moreover, in this embodiment, the first-level prompt is continuously sent to the user in the form of an alert, for example, an application of the mobile device such as the mobile phone of the user always displays the first-level prompt until the system returns to normal, and sends an instant message such as a short message to the user.

In this embodiment, the second-level prompt is used to notify, also in the form of an alert or a prompt box, the user of replacing the component as soon as possible in an application of the mobile device such as the mobile phone of the user, and remind the user once every 24 hours by using an instant message.

The third-level prompt in this embodiment is used to notify, by means of a prompt box or an instant message, the user of an event that the device performance, such as non-standard operations, is affected.

In this embodiment, the fourth-level prompt is displayed in real time in an application of the mobile terminal of the user, such that the user can know the service life status of each of the components in the system in a timely manner.

In another variant example, the cloud server acquires configuration parameters and data in different application modes from a third party such as a manufacturer by means of a mobile communication network, or the Internet, etc. In this case, the cloud server can configure, according to the actual application status of the balance, the latest parameters and data used for system diagnosis.

In still another variant example, the cloud server provides a diagnosis service for a plurality of balances at the same time.

It can be learned from the description of the procedure of the method for diagnosing a weighing system that, a person skilled in the art may clearly understand that the present invention may be implemented by means of software plus a necessary hardware platform. Based on such an understanding, the technical solution of the present invention, in essence or the contribution to the prior art, may be embodied in the form of a software product, and the processing unit software product may be stored in a storage medium, including but not limited to a ROM/RAM (Read-Only Memory/Random Access Memory), a magnetic disk, and an optical disk, which includes several instructions that cause one or more processing unit devices (which may be a personal computer, a server, or a network device) to carry out the methods described in various embodiments or some parts in the embodiment of the present invention.

The method of diagnosing a weighing system in the present invention may be described in a general context of a computer executable instruction executed by the processing unit, for example, a program module. Generally, the program module includes a program, an object, a component, a data structure, etc. for performing a specific task or implementing a specific abstract data type. The present invention may also be practiced in distributed computing environments where a task is performed by a remote processing device that is connected through a communications network. In the distributed computing environments, the program module may be located in local and remote computer storage media, including a storage device.

Although specific embodiments of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. A method for diagnosing a weighing system, the method comprising the steps of:
  acquiring, at a processing unit by way of electronic collection from the weighing system:
    weigh sensor data, at least one status parameter, and at least one operating parameter of each of a plurality of components of the weighing system, said components including at least one weighing sensor, at least one transmitter, a programmable logic controller ("PLC"), a weighing platform, and at least one peripheral sensor;
    environment parameters of an application for which the weighing system is being used; and
    communication data and interaction data among all the components; and
  determining, using the processing unit, a status of each of the components from the weigh sensor data, status parameters, and the operating parameters of all the components;
  obtaining, using the processing unit, a service life status of each of the components from evaluation of the weigh sensor data, status parameters, the operating parameters, and the communication data and interaction data for indications of non-standard use of the weighing system evaluated through table lookup of, and comparison against, non-standard use data parameters, and calculation of the service status life such that, increased indications of non-standard use of the weighing system result in a decrease of the service life status;

calculating and determining, using the processing unit, a system performance status from evaluation of the weigh sensor data, status parameters and operating parameters of each of the components, the communication data and interaction data among all the components, and the environment parameters of the weighing system application using signal analysis of zero drift and, where zero drift exceeding one or more predetermined parameters is detected, a comparison against respective, acceptable parameters;

sending, by way of the processing unit to a device, a first-level prompt comprising fault information when the status of any one of the components is abnormal, such that the system stops operating;

sending, by way of the processing unit to the device, a second-level prompt comprising predicted life time limits which are obtained from the service life status of each of the components through calculation and/or table lookup and comparison when the status of each of the components is normal and the service life status of at least one of the components reaches a preset threshold;

sending, by way of the processing unit to the device, a third-level prompt comprising guidance information of abnormality elimination obtained by means of table lookup or comparison or matching with the system performance abnormality event when the status of each of the components is normal and a system performance abnormality event is identified for the performance status of the system; and sending, by way of the processing unit to the device, a fourth-level prompt comprising service life status information of each of the components or comprises service life status information of each of the components and the predicted life time limits when the status of each of the components is normal.

2. The method of claim 1, wherein:
the four levels of prompts are sent according to different preset reminding modes.

3. The method of claim 2, wherein:
the device comprises at least one of: the weighing system, a mobile terminal, a server, a cloud service device, or a network service device, and
the reminding modes comprise sending the prompt at a preset time interval or continuous sending for a preset time length.

4. The method of claim 1, wherein:
an application mode of the weighing system is acquired by the processing unit, and
the processing unit configures, according to the acquired application mode, the type of a calculation formula, a preset threshold and a table for parameters that are collected in the weighing system,
an abnormality identification algorithm and table, and
the content of reminding modes for the prompts of all the levels.

5. The method of claim 1, wherein:
the type of, a calculation formula and a preset threshold and a table for parameters that are collected in the weighing system,
an abnormality identification algorithm and table, and
the content of reminding modes for all the prompts are acquired from at least one of: a server, a cloud service device, or a network service device, and configured or updated in the processing unit.

6. The method of claim 1, wherein:
when a plurality of different levels of prompts are sent in a given instance, the prompts are provided in order of the first level, the second level, the third level, and the fourth level; and
the prompt with the higher level is provided first.

7. The method of claim 1 wherein:
said at least one weigh sensor data is derived from signals from the weighing sensor; and
said environmental parameters are derived from signals from the at least one peripheral sensor.

8. The method of claim 7 wherein:
said processing unit is located at one or more servers remote from the weighing system;
at least one or more algorithms for performing the calculation and/or the table lookup for comparison are stored at one or more servers remote from the weighing system and comprising said processing unit.

9. A non-transitory storage medium comprising a stored program that, when running, controls a processing unit in which the storage medium is located to perform the method for diagnosing a weighing system of claim 1.

10. A device for diagnosing a weighing system, comprising:
a weighing system that acquires, at a processing unit by way of electronic collection from components of the weighing system:
weigh sensor data, at least one status parameter, and at least one operating parameter of each of the components of the weighing system, said components comprising at least one weighing sensor, at least one transmitter, a programmable logic controller ("PLC"), a weighing platform, and at least one peripheral sensor;
environment parameters of an application for which the weighing system is being used; and
communication data and interaction data among all the components; and
the processing unit, which:
determines a status of each of the components from the weigh sensor data and the at least one status parameter of each of the components, and determines the at least one operating parameter of each of the components,
obtains a service life status of each component from evaluation of the weigh sensor data, status parameters, operating parameters, and the communication data and interaction data for indications of non-standard use of the weighing system evaluated through table lookup of, and comparison against, non-standard use data parameters, and calculation of the service status life such that, increased indications of non-standard use of the weighing system result in a decrease to the service life status, and
calculates and determines a system performance status from evaluation of the weigh sensor data, and operating parameters of each of the components, the communication data and interaction data among all of the components, and the system application environment parameters of the weighing system using signal analysis of zero drift and, where zero drift exceeding one or more predetermined parameters is detected, a comparison against respective, acceptable parameters,
wherein the processing unit is operative to send to a device:

a first-level prompt comprising fault information when the status of any of the components of the weighing system is abnormal, and stops the weighing system from operating;

a second-level prompt comprising predicted life time limits which are obtained from the service life status of each of the components through calculation and/or table lookup and comparison when the status of each of the components is normal and the service life status of at least one of the components reaches a preset threshold;

a third-level prompt comprising guidance information of abnormality elimination obtained by means of table lookup or comparison or matching with the system performance abnormality event when the status of each of the components is normal and a system performance abnormality event is identified for the performance status of the system; and a fourth-level prompt comprising service life status information of each of the components or comprises service life status information of each of the components and the predicted life time limits when the status of each of the components is normal.

11. The device of claim 10, wherein the processing unit is a computer, a server, a cloud service device, or a network service device.

12. The device of claim 10, wherein:
the four levels of prompts are sent according to different preset reminding modes.

13. The device of claim 12, wherein:
the device comprises at least one of: the weighing system, a mobile terminal, a server, a cloud service device, or a network service device, and
the reminding modes comprise sending the prompt at a preset time interval or continuous sending for a preset time length.

14. The device of claim 10, wherein the processing unit acquires an application mode of the weighing system, and configures, according to the application mode:
the type of, a calculation formula, a preset threshold and a table for parameters that are collected in the weighing system,
an abnormality identification algorithm and table, and
the content of reminding modes for the prompts of all the levels.

15. The device of claim 10, wherein the processing unit further acquires, from a third-party server or cloud service device or network service device, for configuring and updating:
the type of a calculation formula, a preset threshold and a table for parameters that are collected in the weighing system,
an abnormality identification algorithm and table, and
the content of and reminding modes for all the prompts.

16. A method for diagnosing a weighing system, the method comprising the steps of:
acquiring, by way of electronic collection from the weighing system:
weigh sensor data, at least one status parameter, and at least one operating parameter of each of a plurality of components of the weighing system, said components of the weighing system including at least one weighing sensor, at least one transmitter, a programmable logic controller ("PLC"), a weighing platform, and at least one peripheral sensor;

environment parameters of an application for which the weighing system is being used; and
communication data and interaction data among all the components; and determining, using a processing unit, a status of each of the components from the weigh sensor data, status parameters, and determining the operating parameters of all the components;

obtaining, using the processing unit, a service life status of each of the components from the weigh sensor data, status parameters, the operating parameters, and the communication data and interaction data through calculation and/or table lookup and comparison;

calculating and determining, using the processing unit, a system performance status from evaluation of the weigh sensor data, status parameters and operating parameters of each of the components, the communication data and interaction data among all the components, and the environment parameters of the weighing system application for indications of non-standard use of the weighing system evaluated using signal analysis of zero drift and, where zero drift exceeding one or more predetermined parameters is detected, a comparison of the weigh sensor data, status parameters and operating parameters of each of the components, the communication data and interaction data among all the components, and the environment parameters of the weighing system application against respective, acceptable parameters;

sending, from the processing unit to a device, a first-level prompt when the status of any one of the components is abnormal, such that the system stops operating;

sending, from the processing unit to the device, a second-level prompt when the status of each of the components is normal and the service life status of at least one of the components reaches a preset threshold;

sending, from the processing unit to the device, a third-level prompt when the status of each of the components is normal and a system performance abnormality event is identified for the performance status of the system; and sending, from the processing unit to the device, a fourth-level prompt when the status of each of the components is normal;

wherein:
an application mode of the weighing system is acquired by the processing unit, and the processing unit configures, according to the acquired application mode, the type of a calculation formula, a preset threshold and a table for parameters that are collected in the weighing system, an abnormality identification algorithm and table, and the content of reminding modes for the prompts of all the levels;

or, wherein:
the type of, a calculation formula and a preset threshold and a table for parameters that are collected in the weighing system, an abnormality identification algorithm and table, and the content of reminding modes for all the prompts are acquired from at least one of: a server, a cloud service device, or a network service device, and configured or updated in the processing unit.

* * * * *